(12) United States Patent
Shah et al.

(10) Patent No.: US 9,491,698 B2
(45) Date of Patent: Nov. 8, 2016

(54) FASTER CELL SELECTION

(71) Applicant: QUALCOMM Incorporated, San Diego, CA (US)

(72) Inventors: Sagar Bharatkumar Shah, San Diego, CA (US); Chulong Chen, San Jose, CA (US); Nate Chizgi, Sunnyvale, CA (US); Je Woo Kim, Santa Clara, CA (US); Sharif Ahsanul Matin, San Diego, CA (US); Rajat Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 14/524,761

(22) Filed: Oct. 27, 2014

(65) Prior Publication Data

US 2015/0304946 A1 Oct. 22, 2015

Related U.S. Application Data

(60) Provisional application No. 61/982,799, filed on Apr. 22, 2014.

(51) Int. Cl.
*H04W 48/20* (2009.01)
*H04W 48/16* (2009.01)

(52) U.S. Cl.
CPC ............. *H04W 48/20* (2013.01); *H04W 48/16* (2013.01)

(58) Field of Classification Search
CPC .... H04W 48/16; H04W 48/20; H04W 36/22
USPC ........................................................ 455/434
See application file for complete search history.

(56) References Cited

U.S. PATENT DOCUMENTS

| | | | |
|---|---|---|---|
| 6,223,037 B1 | 4/2001 | Parkkila | |
| 7,277,709 B2 | 10/2007 | Vadgama | |
| 8,301,145 B2 | 10/2012 | Deivasigamani et al. | |
| 2008/0220784 A1 | 9/2008 | Somasundaram et al. | |
| 2012/0063297 A1* | 3/2012 | Hong | H04W 48/16 370/216 |
| 2013/0109380 A1* | 5/2013 | Centonza | H04W 36/0083 455/434 |
| 2013/0336290 A1* | 12/2013 | Xia | H04W 36/14 370/332 |

(Continued)

OTHER PUBLICATIONS

3GPP 36.304 V12.0.0, Mar. 2014.*

(Continued)

*Primary Examiner* — William Nealon
(74) *Attorney, Agent, or Firm* — Arent Fox LLP

(57) ABSTRACT

Methods and apparatus are described for performing cell selection for reducing an initial acquisition time between a user equipment (UE) and a network entity, comprising measuring a signal from a cell, the signal including at least one system information block (SIB), wherein the at least one SIB includes a plurality of cell selection threshold values; attempting to decode the at least one SIB; determining, in response to successfully decoding the at least one SIB, whether one or more measurements of the signal pass or fail a cell selection criteria check that includes the plurality of cell selection threshold values; determining, in response to the cell selection criteria check failing, whether the plurality of cell selection threshold values are within range of a plurality of corresponding minimum network threshold values; and performing a cell selection procedure on the cell in response to determining that the plurality of cell selection threshold values are within range of the plurality of corresponding minimum network threshold values.

30 Claims, 10 Drawing Sheets

(56) References Cited

U.S. PATENT DOCUMENTS

2014/0036874 A1 2/2014 Jeong et al.
2014/0050129 A1* 2/2014 Magadi Rangaiah ...... H04W 48/20
370/280

OTHER PUBLICATIONS

3GPP 36.133 V10.14.0, Mar. 2014.*
3GPP TSG-RAN WG2 R2-140825, Feb. 2014.*
Alcatel-Lucent Shanghai Bell et al., "Consideration on idle mode MTC UE in enhanced coverage", 3GPP Draft; R2-140729 Consideration on Measurement Control for MTC UE in Enhanced Coverage V07, 3rd Generation Partnership Project (3GPP), Mobile Competence Centre; 650, Route Des Lucioles; F-06921 vol. RAN WG2, No. Prague, Czech Republic; Feb. 10, 2014-Feb. 14, 2014 Feb. 1, 2014 (Feb. 1, 2014), XP050754340, Retrieved from the Internet: URL:http://www.3gpp.org/ftp/tsg_ran/WG2_RL2/TSGR2_85/Docs/.
International Search Report and Written Opinion—PCT/US2015/024082—ISA/EPO—Jul. 22, 2015. (14 total pages).
NTT Docomo: "Expansion of CPICH RSCP range", 3GPP Draft; R2-023224, 3rd Generation Partnership Project (3GPP), Mobile Competence Centre; 650, Route Des Lucioles; F-06921 Sophia-Antipolis Cedex; France, vol. RAN WG2, No. Sophia Antipolis, France; Nov. 18, 2002, Nov. 18, 2002 (Nov. 18, 2002), XP050122661.
Sony: "Enhanced Coverage Issues", 3GPP Draft; R2-140825 Revision of Coverage ENH Idle Mode, 3rd Generation Partnership Project (3GPP), Mobile Competence Centre; 650, Route Des Lucioles; F-06921 Sophia-Antipolis Cedex; France vol. RAN WG2, No. Prague, Czech Republic; Feb. 10, 2014-Feb. 14, 2014 Feb. 9, 2014 (Feb. 9, 2014), XP050792109, Retrieved from the Internet: URL:http://www.3gpp.org/ftp/Meetings_3GPP_SYNC/RAN2/Docs/.

* cited by examiner

FASTER CELL SELECTION

CLAIM OF PRIORITY

The present Application for Patent claims priority to Provisional Application No. 61/982,799 entitled "METHOD AND APPARATUS FOR FASTER CELL SELECTION" filed Apr. 22, 2014, and assigned to the assignee hereof and hereby expressly incorporated by reference herein.

BACKGROUND

Aspects of the present disclosure relate generally to wireless communication systems, and more particularly, to performing cell selection/reselection procedures if a user equipment (UE) is able to successfully decode system information blocks (SIBs).

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In Wideband Code Division Multiple Access (WCDMA) networks, Universal Terrestrial Radio Access Network (UTRAN) broadcasts thresholds in system information blocks (SIBs), which are used by a user equipment (UE) in cell selection/reselection procedures. In an aspect, the network may assume that the UE does not have the capabilities to accurately and consistently decode the transmitted signals if the measured levels of the signals fall below the thresholds. Nonetheless, with recent advancements in UE receiver designs, a UE may be able to decode SIBs on broadcast channels successfully at measured levels lower than indicated by the thresholds. According to the existing solutions, however, since the UE may not register and/or camp on the cell if the measured levels of the signals fall below the thresholds, the UE may have to abort the cell selection procedure.

Thus, improvements in performing a cell search procedure and initiating acquisition of a wireless communication channel are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, the present methods relate to performing cell selection in a wireless communication system for reducing an initial acquisition time between a user equipment (UE) and a network entity, comprising measuring a signal from a cell, the signal including at least one system information block (SIB), wherein the at least one SIB includes a plurality of cell selection threshold values; attempting to decode the at least one SIB; determining, in response to successfully decoding the at least one SIB, whether one or more measurements of the signal pass or fail a cell selection criteria check that includes the plurality of cell selection threshold values; determining, in response to the cell selection criteria check failing, whether the plurality of cell selection threshold values are within range of a plurality of corresponding minimum network threshold values; and performing a cell selection procedure on the cell in response to determining that the plurality of cell selection threshold values are within range of the plurality of corresponding minimum network threshold values.

In accordance with an aspect, the present computer-readable medium storing computer executable code relates to performing cell selection in a wireless communication system for reducing an initial acquisition time between a user equipment (UE) and a network entity, comprising code for measuring a signal from a cell, the signal including at least one system information block (SIB), wherein the at least one SIB includes a plurality of cell selection threshold values; code for attempting to decode the at least one SIB; code for determining, in response to successfully decoding the at least one SIB, whether one or more measurements of the signal pass or fail a cell selection criteria check that includes the plurality of cell selection threshold values; code for determining, in response to the cell selection criteria check failing, whether the plurality of cell selection threshold values are within range of a plurality of corresponding minimum network threshold values; and code for performing a cell selection procedure on the cell in response to determining that the plurality of cell selection threshold values are within range of the plurality of corresponding minimum network threshold values.

In accordance with an aspect, the present apparatus relates to performing cell selection in a wireless communication system for reducing an initial acquisition time between a user equipment (UE) and a network entity, comprising means for measuring a signal from a cell, the signal including at least one system information block (SIB), wherein the at least one SIB includes a plurality of cell selection threshold values; means for attempting to decode the at least one SIB; means for determining, in response to successfully decoding the at least one SIB, whether one or more measurements of the signal pass or fail a cell selection criteria check that includes the plurality of cell selection threshold values; means for determining, in response to the cell selection criteria check failing, whether the plurality of cell selection threshold values are within range of a plurality of corresponding minimum network threshold values; and means for performing a cell selection procedure on the cell in response to determining that the plurality of cell selection threshold values are within range of the plurality of corresponding minimum network threshold values.

In accordance with an aspect, the present apparatus relates to performing cell selection in a wireless communication system for reducing an initial acquisition time between a user equipment (UE) and a network entity, comprising a measurement component configured to measure a signal from a cell, the signal including at least one system information block (SIB), wherein the at least one SIB includes a plurality of cell selection threshold values; a decoding component configured to attempt to decode the at least one SIB; a determining component configured to determine, in response to successfully decoding the at least one SIB, whether one or more measurements of the signal pass or fail a cell selection criteria check that includes the plurality of cell selection threshold values; wherein the determining component is further configured to determine, in response to the cell selection criteria check failing, whether the plurality of cell selection threshold values are within range of a plurality of corresponding minimum network threshold values; and a cell selection component configured to perform a cell selection procedure on the cell in response to determining that the plurality of cell selection threshold values are within range of the plurality of corresponding minimum network threshold values.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify corresponding components or actions throughout, where dashed lines may indicate optional components or actions, and wherein.

DETAILED DESCRIPTION

Figure 1:
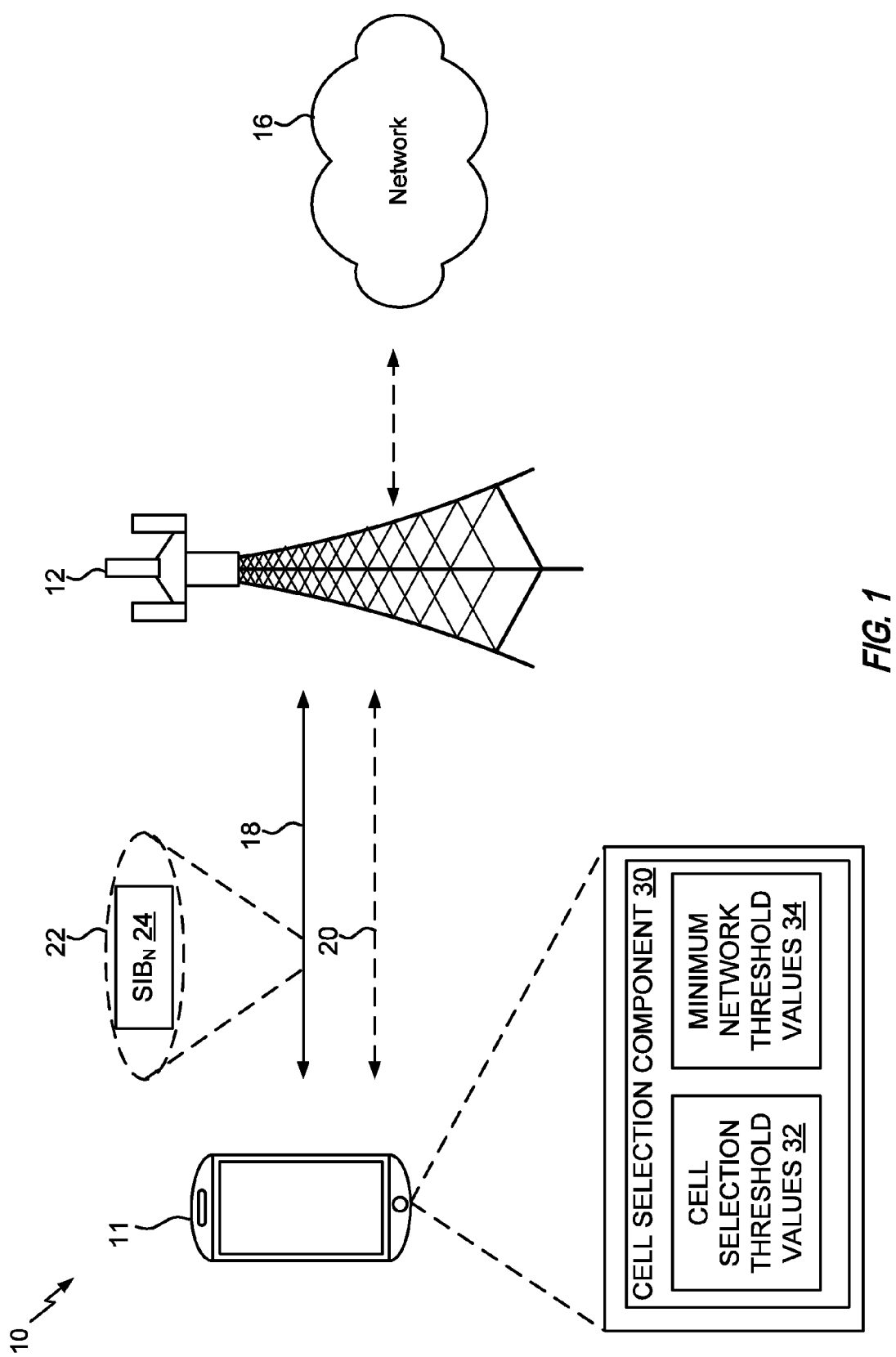
FIG. 1 is a schematic diagram illustrating an example wireless system of aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

The present aspects generally relate to performing a cell selection/reselection procedure when a user equipment (UE) is able to successfully decode system information blocks (SIBs). Specifically, in Wideband Code Division Multiple Access (WCDMA) networks, Universal Terrestrial Radio Access Network (UTRAN) broadcasts thresholds in system information blocks (SIBs), which are used by the UE in cell selection/reselection procedures. In some instances, system information block-3 (SIB3) may include thresholds such as the minimum required quality level in the cell (Qqualmin) and the minimum required level in the cell (Qrxlevmin). These thresholds may represent the minimum values for the signal qualities and signal levels, in Ec/Io and received signal code power (RSCP), respectively, that must be met in order to proceed with cell selection/reselection. For example, the UE may compare these thresholds with its measurement of the signals from the cell to determine if the cell is suitable or not to register and/or camp on. As such, in prior solutions, the measured levels of the signals must be higher than these thresholds in order for the UE to be able to proceed with the cell selection/reselection procedure.

Since these thresholds are set by UTRAN, an assumption exists that a certain level of decoding capability of the UE exists. In an aspect, the network may assume that the UE does not have the capabilities to accurately and consistently decode the transmitted signals if the measured levels of the signals fall below the thresholds. Nonetheless, with recent advancements in UE receiver designs, a UE may be able to decode SIBs on broadcast channels successfully at measured levels lower than indicated by the thresholds. According to the existing solutions, however, since the UE may not register and/or camp on the cell if the measured levels of the signals fall below the thresholds, the UE may have to abort the cell selection/reselection procedure.

Accordingly, in some aspects, the present methods and apparatuses may provide an efficient solution, as compared to current solutions, by enabling the UE to perform a cell selection/reselection procedure on the cell even if the measured levels of the signals from the cell fall below the network-provide (e.g., via SIB3) thresholds. As a result, the present apparatus and methods may reduce the initial acquisition time and reduce the out of service time if the UE was out of service initially.

Referring to FIG. 1, in one aspect, a wireless communication system 10 is configured to facilitate enabling the UE to perform a cell selection/reselection procedure on the cell even if the measured levels of the signals fall below one or more thresholds for proceeding with cell selection/reselection. For purposes of simplicity, the procedures will be explained with regard to cell selection. However, the same concepts apply for cell reselection as well. Wireless communication system 10 includes at least one user equipment (UE) 11 that may communicate wirelessly with one or more networks (e.g., network 16) via one or more network entities, including, but not limited to, network entity 12. UE 11 may communicate with network 16 via network entity 12. For example, in an aspect, network entity 12 may be configured to transmit and receive one or more signals 22 (e.g., packet data units (PDUs)) via one or more communication channels 18 and/or 20, respectively, to/from UE 11. For instance, one or more signals 22 may include one or more SIBs 24.

In certain instances, communication channel 18 may be a Primary Common Control Physical Channel (PCCPCH) wherein one or more signals 22 are transmitted on. In an aspect, one or more signals 22 may include SIBs 24, and more particularly, system information block-3 (SIB3) and system information block-4 (SIB4). SIB3 and SIB4 may include cell selection threshold values 32 such as the minimum required quality level in the cell (Qqualmin) and the minimum required level in the cell (Qrxlevmin). Cell selection threshold values 32 are configured by the network for the cell, and, in some instances, may differ from a plurality of corresponding minimum network threshold values 34. The plurality of corresponding minimum network threshold values 34 may include Qqualmin and Qrxlevmin values corresponding to an absolute minimum value for Qqualmin and Qrxlevmin that the network operator or vendor has established. In some instances, the plurality of corresponding minimum network threshold values 34 may be established by network 16 and broadcasted via network entity 12 to UE 11. As such, UE 11 may be able to measure energy levels of one or more signals 22 below the cell selection threshold values 32.

In an aspect, UE 11 may include a cell selection component 30, which may be configured to enable the UE to perform a cell selection procedure on the cell even if the measured levels of the signals 22 fall below the thresholds in wireless communication system 10. Specifically, in an aspect, cell selection component 30 of UE 11 may be configured to measure a signal (e.g., one of the one or more signals 22) from a cell, the signal including at least one SIB of the one or more SIBs 24, wherein the at least one SIB 24 includes a plurality of cell selection threshold values 32. Further, cell selection component 30 may be configured to attempt to decode the at least one SIB 24. Cell selection component 30 may be configured to determine, in response to successfully decoding the at least one SIB 24, whether one or more measurements of the signal 22 pass or fail a cell selection criteria check that includes the plurality of cell selection threshold values 32. Moreover, cell selection component 30 may be configured to determine, in response to the cell selection criteria check failing, whether the plurality of cell selection threshold values 32 are within range of a plurality of corresponding minimum network threshold values 34. Additionally, cell selection component 30 may be configured to perform a cell selection procedure on the cell in response to determining that the plurality of cell selection threshold values 32 are within range of the plurality of corresponding minimum network threshold values 34. In another aspect, cell selection component 30 may be configured to attempt to discover a different cell for attempting to perform the cell selection procedure on in response to determining that the plurality of cell selection threshold values 32 are outside the range of the plurality of corresponding minimum network threshold values 34.

Moreover, cell selection component 30 may be configured to determine whether a delta value for one of the plurality of cell selection threshold values 32 is configured. Specifically, determining whether the plurality of cell selection threshold values 32 are within range of the plurality of corresponding minimum network threshold values 34 in response to the cell selection criteria check failing comprises the cell selection component 30 determining whether a delta value for one of the plurality of cell selection threshold values 32 is configured. As such, cell selection component 30 may determine that when the delta value (e.g., Delta-Qrxlevmin) for the one of the plurality of cell selection threshold values 32 (e.g., Qrxlevmin) was configured, one of the plurality of corresponding minimum network threshold values 34 (e.g., Qrxlevmin) comprises an absolute minimum network threshold value plus the delta value for the one of the plurality of cell selection threshold values. For example, the delta value may be configured, but not limited, to −4. As a result, cell selection component 30 may establish that one of the plurality of corresponding minimum network threshold values 34 (e.g., Qrxlevmin with an initial value of −115 dBm) has a value of −119 dBm.

Similarly, cell selection component 30 may determine that when the delta value for the one of the plurality of cell selection threshold values 32 was not configured, one of the plurality of corresponding minimum network threshold values 34 comprises an absolute minimum network threshold value. In some aspects, the delta value (e.g., Delta-Qrxlevmin) may be received by UE 11 and/or cell selection component 30 as part of the one or more signals 22 on communication channel 18.

Further, cell selection component 30 may be configured to determine whether the cell is a time-division duplexing (TDD) cell or a frequency-division duplexing (FDD) cell. For example, if cell selection component 30 determines that the cell is a TDD cell, then cell selection component 30 may determine whether an absolute value of each of the plurality of cell selection threshold values 32 plus each of the plurality of corresponding minimum network threshold values 34 are less than or equal to each of a plurality of corresponding range control threshold values. In some instances, the plurality of corresponding range control threshold values are configured based on at least one of the UE capabilities, network planning, and operator configuration.

On the other hand, if cell selection component 30 determines that the cell is a FDD cell, then cell selection component 30 may determine whether an absolute value of the one of the plurality of cell selection threshold values 32 plus the one of the plurality of corresponding minimum network threshold values 34 is less than or equal to a corresponding range control threshold value.

UE 11 may comprise a mobile apparatus and may be referred to as such throughout the present disclosure. Such a mobile apparatus or UE 11 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more wireless nodes, including, but not limited to, network entity 12 of wireless communication system 10, may include one or more of any type of network component, such as an access point, including a base station or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 10 may include one or more small cell base stations, such as, but not limited to a femtocell, picocell, microcell, or any other base station having a relatively small transmit power or relatively small coverage area as compared to a macro base station.

Figure 2:
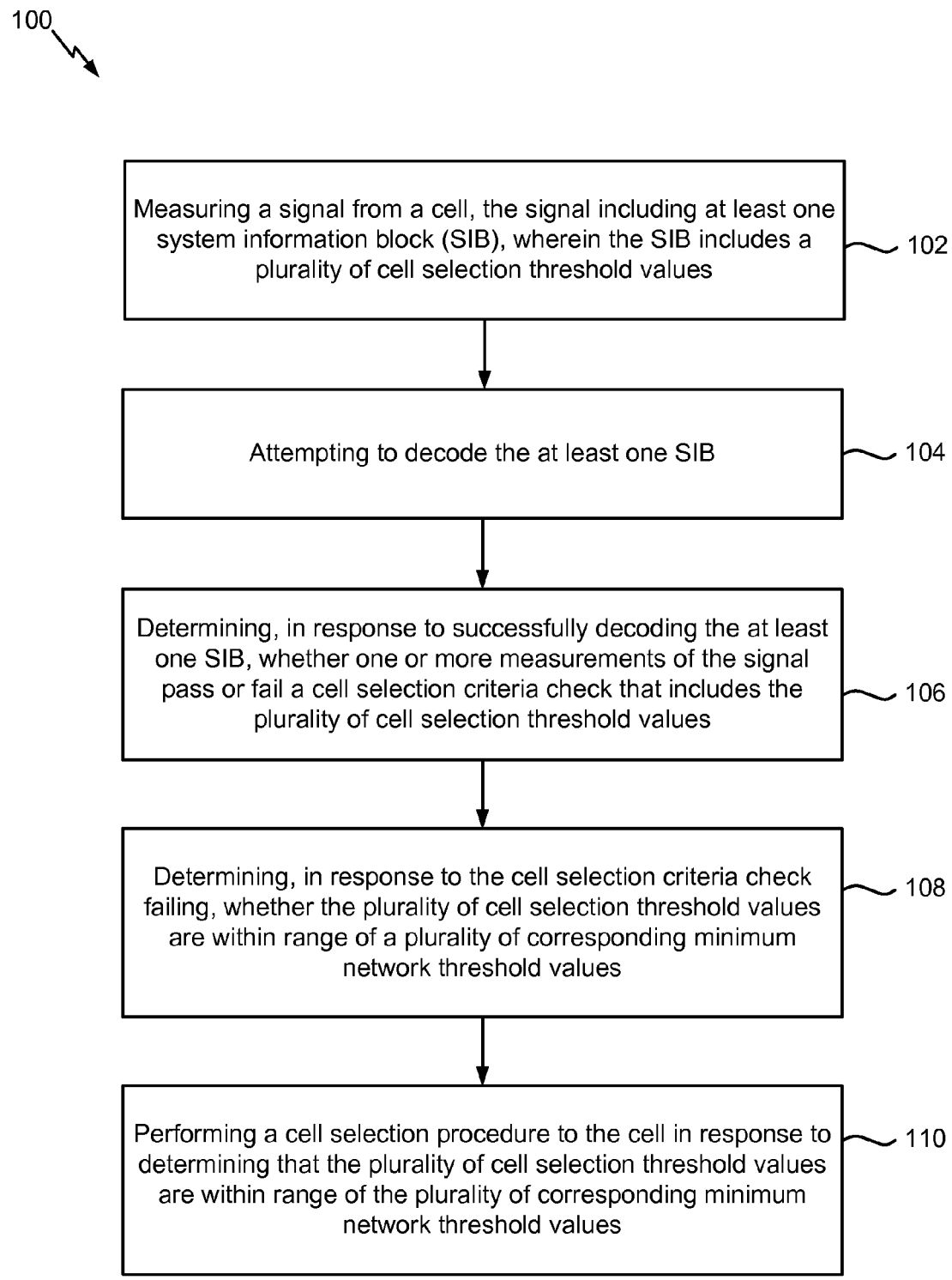
FIG. 2 is a flow diagram illustrating an example method in a wireless communication system.

Referring to FIG. 2, the method is shown and described as a series of acts for purposes of simplicity of explanation. However, it is to be understood and appreciated that the method (and further methods related thereto) are not limited by the order of acts, as some acts may, in accordance with one or more aspects, occur in different orders and/or concurrently with other acts from that shown and described herein. For example, it is to be appreciated that the methods may alternatively be represented as a series of interrelated states or events, such as in a state diagram. Moreover, not all illustrated acts may be required to implement a method in accordance with one or more features described herein.

In an operational aspect, a UE such as UE 11 (FIG. 1) may perform one aspect of a method 100 for enabling the UE to perform a cell selection procedure on the cell even if the measured levels of the signals 22 fall below the thresholds (e.g., cell selection threshold values 32) in wireless communication system 10.

At block 102, method 100 may include measuring a signal from a cell, the signal including at least one SIB, wherein the at least one SIB includes a plurality of cell selection threshold values. For example, as described herein, UE 11 (FIG. 1) may execute cell selection component 30 to measure a signal 22 from a cell, the signal including at least one SIB 24, wherein the at least one SIB 24 includes a plurality of cell selection threshold values 32.

In an aspect, at block 104, method 100 may include attempting to decode the at least one SIB. For example, as described herein, UE 11 (FIG. 1) may execute cell selection component 30 to attempt to decode the at least one SIB 24.

At block 106, method 100 may include determining, in response to successfully decoding the at least one SIB, whether one or more measurements of the signal pass or fail a cell selection criteria check that includes the plurality of cell selection threshold values. For example, as described herein, UE 11 (FIG. 1) may execute cell selection component 30 to determine, in response to successfully decoding the at least one SIB 24, whether one or more measurements of the signal 22 pass or fail a cell selection criteria check that includes the plurality of cell selection threshold values 32.

Further, at block 108, method 100 may include determining, in response to the cell selection criteria check failing, whether the plurality of cell selection threshold values are within range of a plurality of corresponding minimum network threshold values. For example, as described herein, UE 11 (FIG. 1) may execute cell selection component 30 to determine, in response to the cell selection criteria check failing, whether the plurality of cell selection threshold values 32 are within range of a plurality of corresponding minimum network threshold values 34.

Subsequently, at block 110, method 100 may include performing a cell selection procedure on the cell in response to determining that the plurality of cell selection threshold values are within range of the plurality of corresponding minimum network threshold values. For example, as described herein, UE 11 (FIG. 1) may execute cell selection component 30 to perform a cell selection procedure on the cell in response to determining that the plurality of cell selection threshold values 32 are within range of the plurality of corresponding minimum network threshold values 34.

Figure 3:
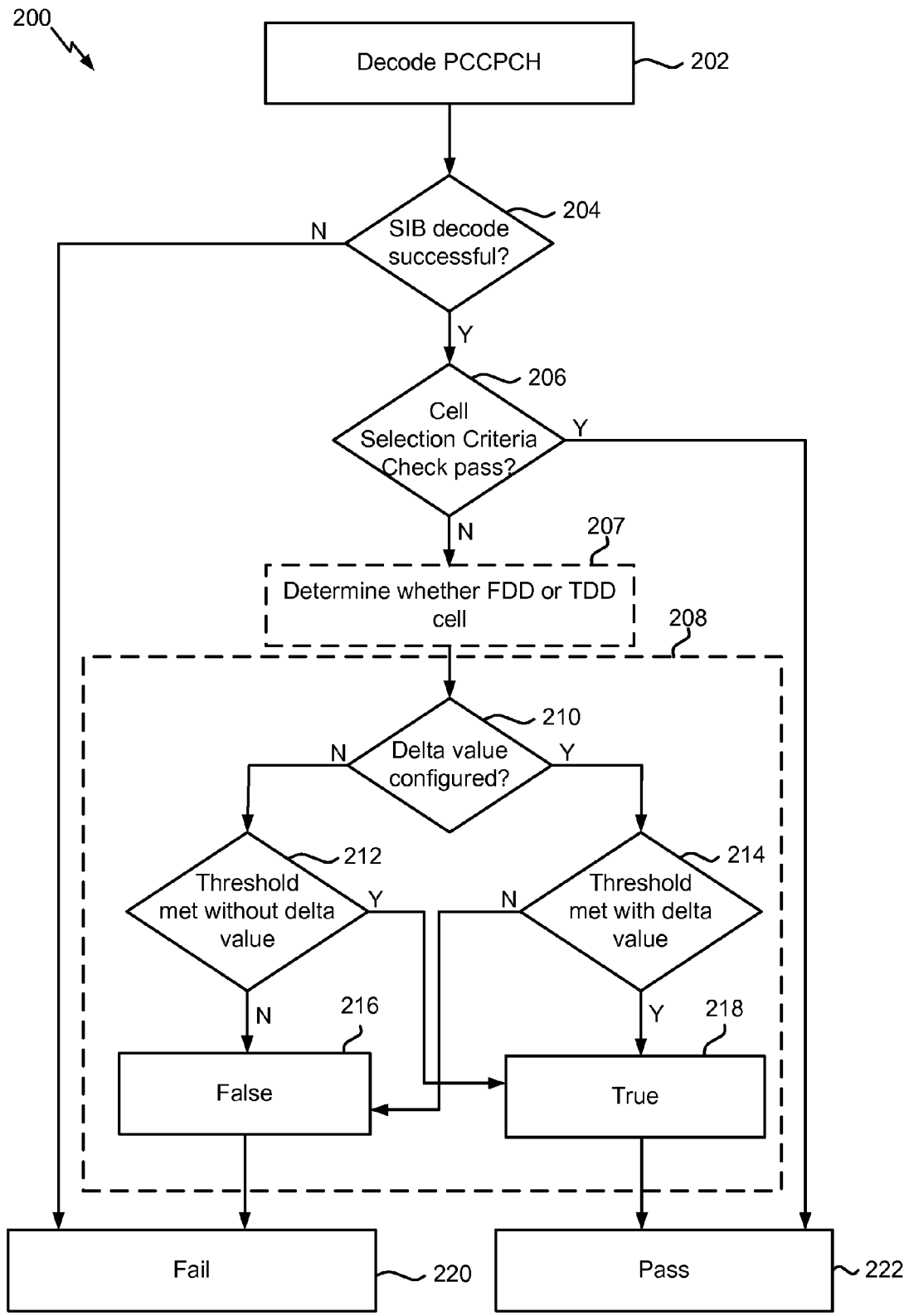
FIG. 3 is a flow diagram illustrating another example method in a wireless system.
Figure 4:
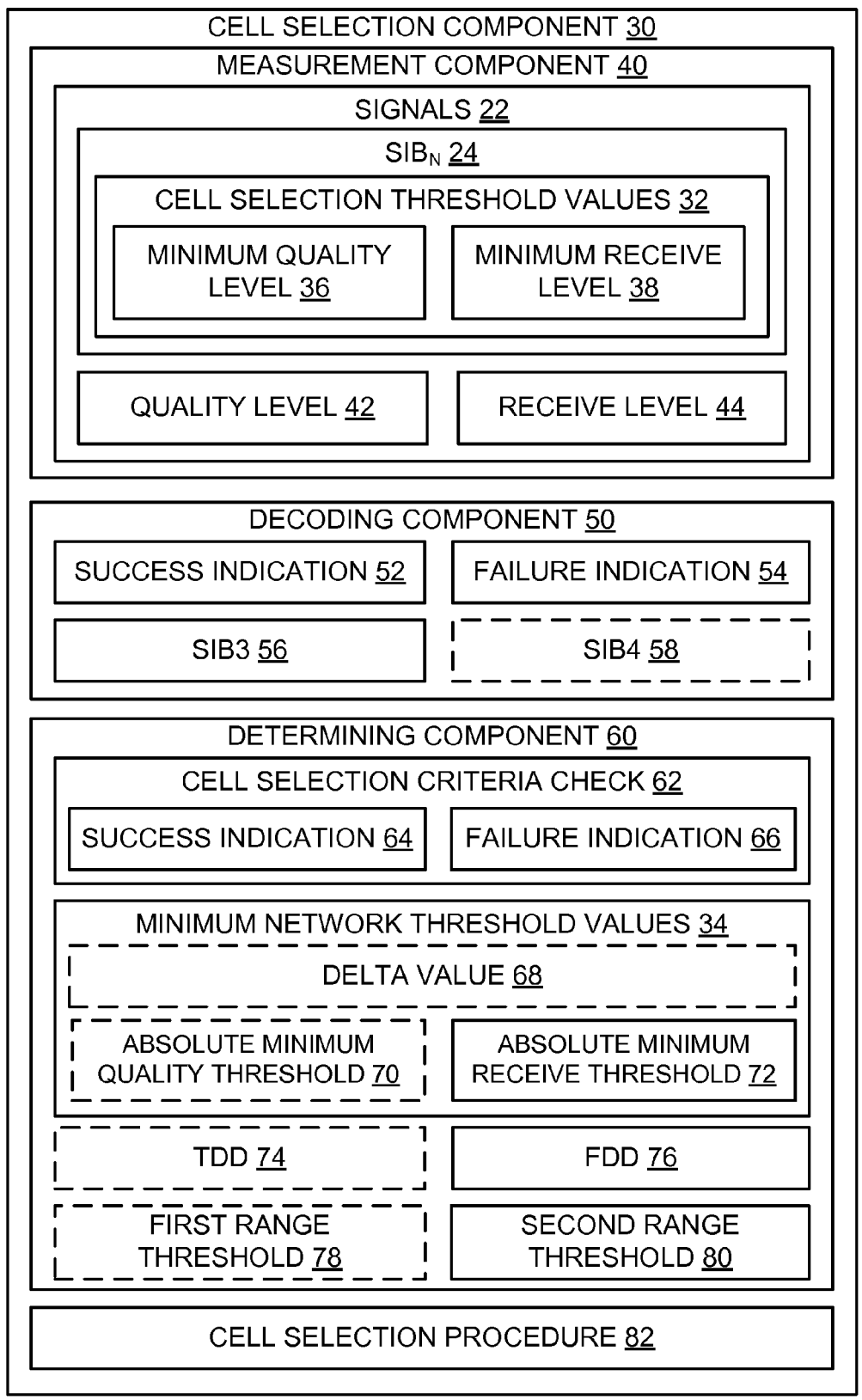
FIG. 4 is a schematic diagram illustrating an example of an aspect of cell selection component of the present disclosure.

Referring to FIGS. 3 and 4, an example of one or more operations of an aspect of cell selection component 30 (FIG. 1) according to the present apparatus and methods are described with reference to one or more methods and one or more components that may perform the actions or functions of these methods. Although the operations described below are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

In a particular aspect, a method 200 of wireless communication includes, at block 202 (FIG. 3), decoding a PCCPCH. In an aspect, for instance, cell selection component 30 may execute measurement component 40 (FIG. 4) to measure one or more signals 22 on a communication channel, such as communication channel 18, which may be a Primary Common Control Physical Channel (PCCPCH) on which the one or more signals 22 are transmitted. In an aspect, one or more signals 22 may include one or more SIBS, $SIB_N$ 24. Each SIB's cell selection threshold values 32 may be established once it has been successfully decoded by decoding component 50. In some instances, the plurality of corresponding minimum network threshold values 34 may be established by network 16 and broadcasted via network entity 12 to UE 11, e.g., in a SIB message such as a SIB3 and/or SIB4. As such, UE 11 and/or measurement component 40 may be able to measure energy levels of one or more signals 22 and determine if they are below the cell selection threshold values 32 by measuring signals 22 on communication channel 18 (e.g., PCCPCH). For example, measurement component 40 may measure energy levels of one or more signals 22, where the measurement may include a quality level 42 (e.g., Qqualmin) and receive level 44 (e.g., Qrxlevmin).

In an aspect, once the one or more signals 22 are measured by measurement component 40, cell selection component 30 may execute decoding component 50 to attempt to decode the at least one $SIB_N$ 24. For example, $SIB_N$ 24 may correspond to a plurality of SIBs, including system information block-3 (SIB3) 56 and system information block-4 (SIB4) 58. As such, when one of the signals 22 is successfully decoded by decoding component 50, a number of $SIB_N$ 24 are successfully decoded including SIB3 56 and/or SIB4 58. Once successfully decoded, the corresponding cell selection threshold values 32, including the required minimum quality level 36 in the cell (Qqualmin) and the required minimum receive level 38 in the cell (Qrxlevmin) for SIB3 and/or SIB4 58, are known. In certain instances cell selection threshold values 32 may be configured by the network 16 (FIG. 1) for the cell, and, in some instances, may differ from a plurality of corresponding minimum network threshold values 34. In an aspect, the plurality of corresponding minimum network threshold values 34 may include absolute minimum quality threshold 70 and absolute minimum receive threshold 72 corresponding to an absolute minimum value for Qqualmin and Qrxlevmin, respectively, that the network operator or vendor has established.

At block 204, an aspect of method 200 may further include determining whether at least one SIB was successfully decoded. In an aspect, for instance, cell selection component 30 may execute determining component 60 (FIG. 4) to determine whether decoding component 50 has successfully decoded at least one SIB. For example, decoding component 50 may generate and/or transmit a success indication 52 if one of $SIB_N$ 24 (e.g., SIB3 56 and/or SIB4 58) were successfully decoded. Moreover, decoding component 50 may generate and/or transmit a failure indication 54 if one of $SIB_N$ 24 (e.g., SIB3 56 and/or SIB4 58) were not successfully decoded. In another aspect, network entity 12 may be configured with a timer, wherein the timer is set to expire if an acknowledgment message (e.g., ACK and/or NACK) is not received prior to expiration. If the timer expires prior to receiving an ACK and/or NACK, then network entity 12 may transmit a failure indication 54 to UE 11 and/or cell selection component 30. As such, determining component 60 may receive either the success indication 52 or the failure indication 54 and determine that at least one SIB was successfully decoded or not. In instances where cell selection component 30 and/or determining component 60 receives a failure indication 54, method 200 may proceed to block 220. In instances where cell selection component 30 and/or determining component 60 receives a success indication 52 and determines that at least one SIB was successfully decoded, method 200 may proceed to block 206.

Further, at block 206, an aspect of method 200 may include determining whether a cell selection criteria check has passed. In an aspect, for instance, cell selection component 30 may execute determining component 60 (FIG. 4) to perform a cell selection criteria check 62. For example, cell selection criteria check 62 may include determining a cell selection quality value (dB) and a cell selection receive level value (dB) based on the measured quality level 42 and receive level 44, and the minimum quality level 36 and minimum receive level 38. In some instances, if the measured quality level 42 is at or above the minimum quality level 36 and if the measured receive level 44 is at or above the minimum receive level 38, then determining component 60 may generate a success indication 64 indicating that the cell selection criteria check 62 has passed. However, if the measured quality level 42 is below the minimum quality level 36 and if the measured receive level 44 is below the minimum receive level 38, then determining component 60 may generate a failure indication 66 indicating that the cell selection criteria check 62 has failed. In instances where cell selection component 30 and/or determining component 60 generates a failure indication 66, method 200 may proceed to block 210. In instances where cell selection component 30 and/or determining component 60 generates a success indication 64 and determines that the cell selection criteria check 62 has passed, method 200 may proceed to block 222.

Further, at block 207, method 200 may optionally include at any point before blocks 212 and/or 214 the step of determining whether the cell is a time-division duplexing (TDD) cell or a frequency-division duplexing (FDD) cell. For example, if determining component 60 determines that the cell is a TDD cell 74, then the determining component 60 may configure the minimum network threshold values 34 to include both absolute minimum quality threshold 70 and absolute minimum receive threshold 72. In contrast, if determining component 60 determines that the cell is a FDD cell 76, then the determining component 60 may configure the minimum network threshold values 34 to include only the absolute minimum receive threshold 72. In some instances, the absolute minimum threshold quality 70 and absolute minimum receive threshold 72 are configured based on at least one of the UE capabilities, network planning, and operator configuration.

At block 208, an aspect of method 200 may optionally include one or more actions for determining whether the plurality of cell selection threshold values are within range of a plurality of corresponding minimum network threshold values. In an aspect, for instance, cell selection component 30 may execute determining component 60 (FIG. 4) to determine whether the plurality of cell selection threshold values 32 are within range of a plurality of corresponding minimum network threshold values 34. For example, determining component 60 may determine whether the minimum quality level 36 and minimum receive level 38 are within range of the absolute minimum quality threshold 70 and absolute minimum receive threshold 72, respectively. Moreover, block 208 may include blocks 210-218 corresponding to a detailed procedure of determining whether the plurality of cell selection threshold values 32 are within range of a plurality of corresponding minimum network threshold values 34.

More specifically, for example, at block 210, an aspect of method 200 may include determining whether a delta value is configured. In an aspect, for instance, cell selection component 30 may execute determining component 60 (FIG. 4) to determining whether a delta value 68 is configured. For example, determining component 60 may determine that when the delta value 68 (e.g., Delta-Qrxlevmin) for the one of the plurality of cell selection threshold values 32 (e.g., minimum receive level 38) was configured, then one of the plurality of corresponding minimum network threshold values 34 (e.g., absolute minimum receive threshold 72) comprises an absolute minimum receive threshold 72 plus the delta value 68. For example, the delta value 68 may be configured to be, but not limited to, a value sufficient to establish a network minimum threshold, such as a value of −4. As a result, determining component 60 may establish that absolute minimum receive threshold 72 (e.g., but not limited hereto, Qrxlevmin with an initial value of −115 dBm) has a value of −119 dBm. Similarly, determining component 60 may determine that when the delta value for the one of the plurality of cell selection threshold values 32 was not configured, one of the plurality of corresponding minimum network threshold values 34 comprises only an absolute minimum network threshold value. For instance, in one non-limiting example, absolute minimum receive threshold 72 (e.g., Qrxlevmin) has a value of −115 dBm when the delta value 68 is not configured. In some aspects, the delta value 68 (e.g., Delta-Qrxlevmin) may be received by UE 11 and/or cell selection component 30 as part of the one or more signals 22, via one or more SIBs, on communication channel 18. In instances where the delta value 68 is not configured, method 200 may proceed to block 212, wherein cell selection component 30 uses minimum network threshold values 34 comprising, among other, the absolute minimum receive threshold 72 without the delta value 68. In instances where the delta value 68 is configured, method 200 may proceed to block 214, wherein cell selection component 30 uses minimum network threshold values 34 comprising, among other things, the absolute minimum receive threshold 72 with the delta value 68.

Moreover, at block 212, an aspect of method 200 may include determining whether an absolute value of each of the plurality of cell selection threshold values plus each of the plurality of corresponding minimum network threshold values without the delta value included are less than or equal to a corresponding range control threshold value. In an aspect, for instance, if the cell is configured as a FDD cell 76, cell selection component 30 may execute determining component 60 (FIG. 4) to determine whether an absolute value of minimum quality level 36 plus the absolute minimum quality threshold 70 is less than or equal to a first range threshold 78 and whether an absolute value of minimum receive level 38 plus the absolute minimum receive threshold 72 without the delta value 68 included is less than or equal to a second range threshold 80. In another aspect, for instance, if the cell is configured as a TDD cell 74, cell selection component 30 may execute determining component 60 (FIG. 4) to determine only whether an absolute value of minimum receive level 38 without the delta value 68 included plus the absolute minimum receive threshold 72 is less than or equal to a second range threshold 80. In instances wherein the determining component 60 determines that an absolute value of each of the plurality of cell selection threshold values plus each of the plurality of corresponding minimum network threshold values without the delta value included are less than or equal to a corresponding range control threshold value, then method 200 may proceed to block 218. However, in instances wherein the determining component 60 determines that an absolute value of each of the plurality of cell selection threshold values plus each of the plurality of corresponding minimum network threshold values without the delta value included are greater than a corresponding range control threshold value, then method 200 may proceed to block 216.

Further, at block 214, an aspect of method 200 may include determining whether an absolute value of the one of the plurality of cell selection threshold values plus the one of the plurality of corresponding minimum network threshold values including the delta value is less than or equal to a corresponding range control threshold value. In an aspect, for instance, if the cell is configured as a FDD cell 76, cell selection component 30 may execute determining component 60 (FIG. 4) to determine whether an absolute value of minimum quality level 36 plus the absolute minimum quality threshold 70 is less than or equal to a first range threshold 78 and whether an absolute value of minimum receive level 38 plus the absolute minimum receive threshold 72 with the delta value 68 included is less than or equal to a second range threshold 80. In another aspect, for instance, if the cell is configured as a TDD cell 74, cell selection component 30 may execute determining component 60 (FIG. 4) to determine only whether an absolute value of minimum receive level 38 with the delta value 68 included plus the absolute minimum receive threshold 72 is less than or equal to a second range threshold 80. In instances wherein the determining component 60 determines that an absolute value of each of the plurality of cell selection threshold values 32 plus each of the plurality of corresponding minimum network threshold values 34 with the delta value 68 included are less than or equal to a corresponding range control threshold value, then method 200 may proceed to block 218. However, in instances wherein the determining component 60 determines that an absolute value of each of the plurality of cell selection threshold values 32 plus each of the plurality of corresponding minimum network threshold values 34 with the delta value 68 included are greater than a corresponding range control threshold value, then method 200 may proceed to block 216.

As such, the outcome of block 208 may include either an indication of false (e.g., block 216) or true (e.g., block 218) corresponding to whether the plurality of cell selection threshold values 32 are within range of a plurality of corresponding minimum network threshold values 34. In some instances, cell selection component 30 may determine whether to initiate a cell selection procedure 82 based on the outcome of block 208.

At blocks 220 and 222, an aspect of method 200 may include establishing that the determination of whether the plurality of cell selection threshold values are within range of a plurality of corresponding minimum network threshold values either failed or passed. In an aspect, for instance, at block 220 and corresponding to a "fail," cell selection component 30 may attempt to discover a different cell for attempting to perform the cell selection procedure 82 on in response to determining that the plurality of cell selection threshold values 32 are outside the range of the plurality of corresponding minimum network threshold values 34. In another aspect, for instance, at block 222 and corresponding to a "pass," cell selection component 30 may be configured to perform a cell selection procedure 82 on the cell in response to determining that the plurality of cell selection threshold values 32 are within range of the plurality of corresponding minimum network threshold values 34.

Figure 5:
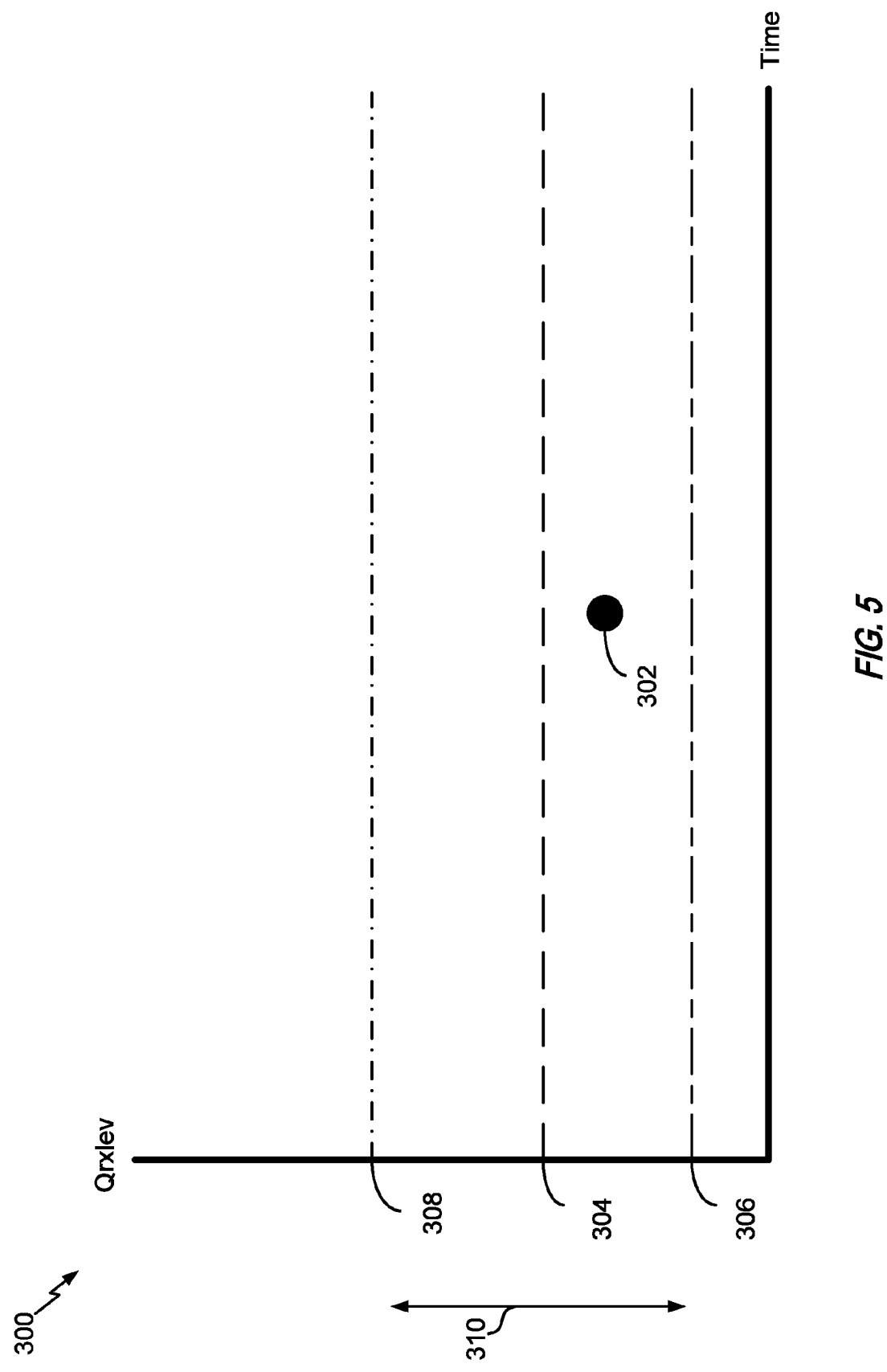
FIG. 5 is a conceptual diagram illustrating an example of aspects of the present disclosure.

FIG. 5 is a conceptual diagram 300 illustrating an example of a UE, such as UE 11 (FIG. 1) configured with cell selection component 30, measuring a cell selection Rx level value (Qrxlev) 302 of a signal 22 within a cell, and comparing the Qrxlev 302 with the corresponding cell selection threshold value 32 and determines whether the corresponding cell selection threshold value 32 is within range of the plurality of corresponding minimum network threshold values 34. For example, threshold 304 may be one of the plurality of cell selection threshold values 32 decoded by cell selection component 30 (e.g., Qrxlevmin). For purposes of this example it is assumed that threshold 304 corresponds to Qrxlevmin plus Delta-Qrxlevmin. Further, threshold 306 may be one of the plurality of corresponding minimum network threshold values 34. In some instances, in an example that should not be construed as limiting, threshold 306 may have a value of −119 dBm. Additionally, threshold 308 may be the upper limit of a range of values defined by one of the plurality of corresponding range control threshold values 310. In some instances, in an example that should not be construed as limiting, the plurality of corresponding minimum network threshold values 34 may comprise a value of −24 dB for Qqualmin and a value of −115 dBm for Qrxlevmin. In certain aspects, in an example that should not be construed as limiting, a delta value (e.g., Delta-Qrxlevmin) may be configured which may cause the Qrxlevmin characteristic of the plurality of corresponding minimum network threshold values 34 to have a value up to −119 dBm depending on the delta value. In certain situations, in an example that should not be construed as limiting, cell selection component 30 may configure Qrxlevmin to maintain a value of −115 dBm when no Delta-Qrxlevmin was received.

In an aspect, cell selection component 30 may determine whether an absolute value of threshold 304 plus threshold 302 is less than or equal to a corresponding range control threshold value 310. As such, cell selection component 30 may determine that Qrxlev 302 is below threshold 304, which would normally be the minimum threshold needed to proceed with cell selection, but that threshold 304 is within range 310 of threshold 306. As a result, cell selection component 30 may be configured to perform a cell selection procedure on the cell. In other words, even though Qrxlev 302 is below what would normally be considered a minimum level for proceeding with cell selection, according to the present aspects UE 11 may proceed with cell selection as long as the SIB can be decoded, and hence identify threshold 304, as being within range 310 indicates that threshold 304 is close enough to an absolute minimum level, e.g., threshold 306, that the network is not using threshold 304 to manage traffic or for other network management purposes. It should be noted that while this example utilizes Qrxlev, in an aspect, UE 11 would make the above determination based on both Qrxlev and Qqual.

Figure 6:
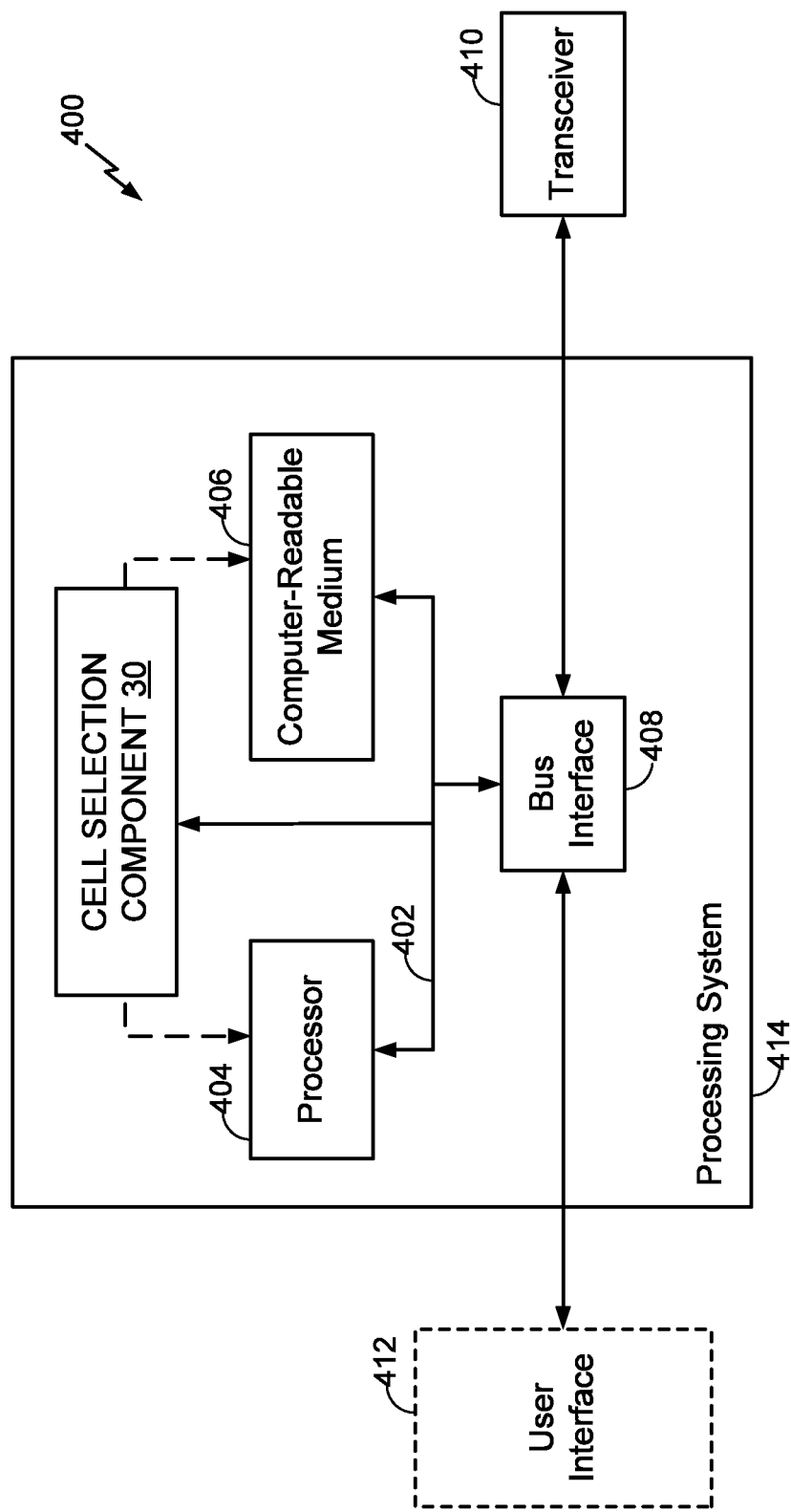
FIG. 6 is a block diagram illustrating an example of a hardware implementation for an apparatus employing a processing system.

FIG. 6 is a block diagram illustrating an example of a hardware implementation for an apparatus 400 employing a processing system 414, where apparatus 400 may be UE 11 (FIG. 1) or may be included with UE 11, and where apparatus 400 is configured with cell selection component 30 for performing the actions described herein. In this example, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors, represented generally by the processor 404, and computer-readable media, represented generally by the computer-readable medium 406. The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

The processor 404 is responsible for managing the bus 402 and general processing, including the execution of software stored on the computer-readable medium 406. The software, when executed by the processor 404, causes the processing system 414 to perform the various functions described infra for any particular apparatus. The computer-readable medium 406 may also be used for storing data that is manipulated by the processor 404 when executing software. The cell selection component 30 may be a part of processor 404 and/or computer-readable medium 406.

Figure 7:
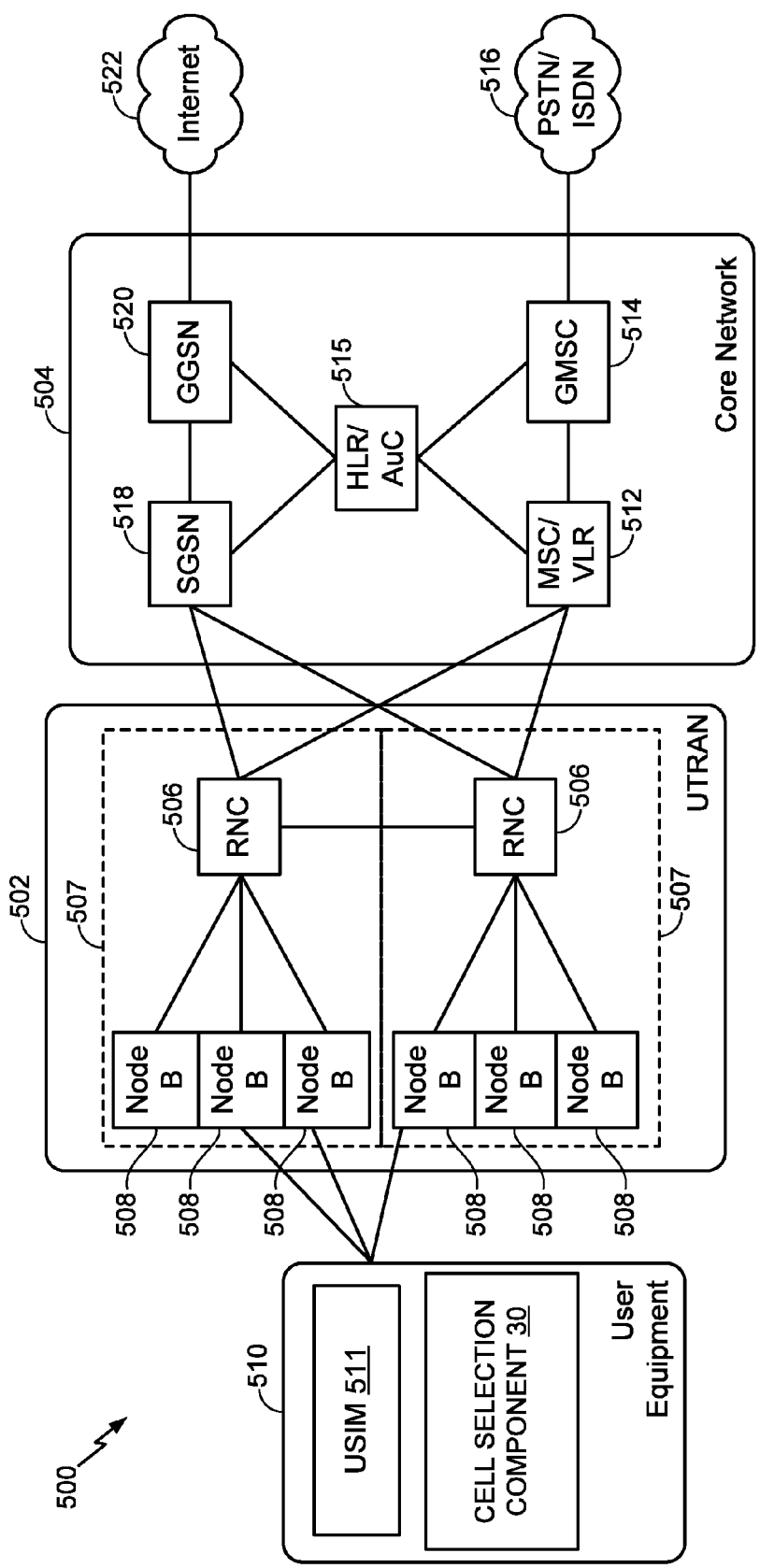
FIG. 7 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 7 are presented with reference to a UMTS system 500 employing a W-CDMA air interface. In this case, user equipment 510 may be the same as or similar to UE 11 of FIG. 1, and may include cell selection component 30 as described herein. A UMTS network includes three interacting domains: a Core Network (CN) 504, a UMTS Terrestrial Radio Access Network (UTRAN) 502, and User Equipment (UE) 510. In this example, the UTRAN 502 provides various wireless services including telephony, video, data, messaging, broadcasts, and/or other services. The UTRAN 502 may include a plurality of Radio Network Subsystems (RNSs) such as an RNS 507, each controlled by a respective Radio Network Controller (RNC) such as an RNC 506. Here, the UTRAN 502 may include any number of RNCs 506 and RNSs 507 in addition to the RNCs 506 and RNSs 507 illustrated herein. The RNC 506 is an apparatus responsible for, among other things, assigning, reconfiguring and releasing radio resources within the RNS 507. The RNC 506 may be interconnected to other RNCs (not shown) in the UTRAN 502 through various types of interfaces such as a direct physical connection, a virtual network, or the like, using any suitable transport network.

Communication between a UE 510 and a Node B 508 may be considered as including a physical (PHY) layer and a medium access control (MAC) layer. Further, communication between a UE 510 and an RNC 506 by way of a respective Node B 508 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 507 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 508 are shown in each RNS 507; however, the RNSs 507 may include any number of wireless Node Bs. The Node Bs 508 provide wireless access points to a CN 504 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 510 may further include a universal subscriber identity module (USIM) 511, which contains a user's subscription information to a network. For illustrative purposes, one UE 510 is shown in communication with a number of the Node Bs 508. The DL, also called the forward link, refers to the communication link from a Node B 508 to a UE 510, and the UL, also called the reverse link, refers to the communication link from a UE 510 to a Node B 508.

The CN 504 interfaces with one or more access networks, such as the UTRAN 502. As shown, the CN 504 is a GSM core network. However, as those skilled in the art will recognize, the various concepts presented throughout this disclosure may be implemented in a RAN, or other suitable access network, to provide UEs with access to types of CNs other than GSM networks.

The CN 504 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 504 supports circuit-switched services with a MSC 512 and a GMSC 514. In some applications, the GMSC 514 may be referred to as a media gateway (MGW). One or more RNCs, such as the RNC 506, may be connected to the MSC 512. The MSC 512 is an apparatus that controls call setup, call routing, and UE mobility functions. The MSC 512 also includes a VLR that contains subscriber-related information for the duration that a UE is in the coverage area of the MSC 512. The GMSC 514 provides a gateway through the MSC 512 for the UE to access a circuit-switched network 516. The GMSC 514 includes a home location register (HLR) 515 containing subscriber data, such as the data reflecting the details of the services to which a particular user has subscribed. The HLR is also associated with an authentication center (AuC) that contains subscriber-specific authentication data. When a call is received for a particular UE, the GMSC 514 queries the HLR 515 to determine the UE's location and forwards the call to the particular MSC serving that location.

The CN 504 also supports packet-data services with a serving GPRS support node (SGSN) 518 and a gateway GPRS support node (GGSN) 520. GPRS, which stands for General Packet Radio Service, is designed to provide packet-data services at speeds higher than those available with standard circuit-switched data services. The GGSN 520 provides a connection for the UTRAN 502 to a packet-based network 522. The packet-based network 522 may be the Internet, a private data network, or some other suitable packet-based network. The primary function of the GGSN 520 is to provide the UEs 510 with packet-based network connectivity. Data packets may be transferred between the GGSN 520 and the UEs 510 through the SGSN 518, which performs primarily the same functions in the packet-based domain as the MSC 512 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 508 and a UE 510. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 510 provides feedback to the node B 508 over the HS-DPCCH to indicate whether it correctly decoded a packet on the downlink.

HS-DPCCH further includes feedback signaling from the UE 510 to assist the node B 508 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 508 and/or the UE 510 may have multiple antennas supporting MIMO technology. The use of MIMO technology enables the node B 508 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multi-path fading and increase transmission quality, and spatial multiplexing gains to increase data throughput.

Spatial multiplexing may be used to transmit different streams of data simultaneously on the same frequency. The data steams may be transmitted to a single UE 510 to increase the data rate or to multiple UEs 510 to increase the overall system capacity. This is achieved by spatially precoding each data stream and then transmitting each spatially precoded stream through a different transmit antenna on the downlink. The spatially precoded data streams arrive at the UE(s) 510 with different spatial signatures, which enables each of the UE(s) 510 to recover the one or more the data streams destined for that UE 510. On the uplink, each UE 510 may transmit one or more spatially precoded data streams, which enables the node B 508 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 8:
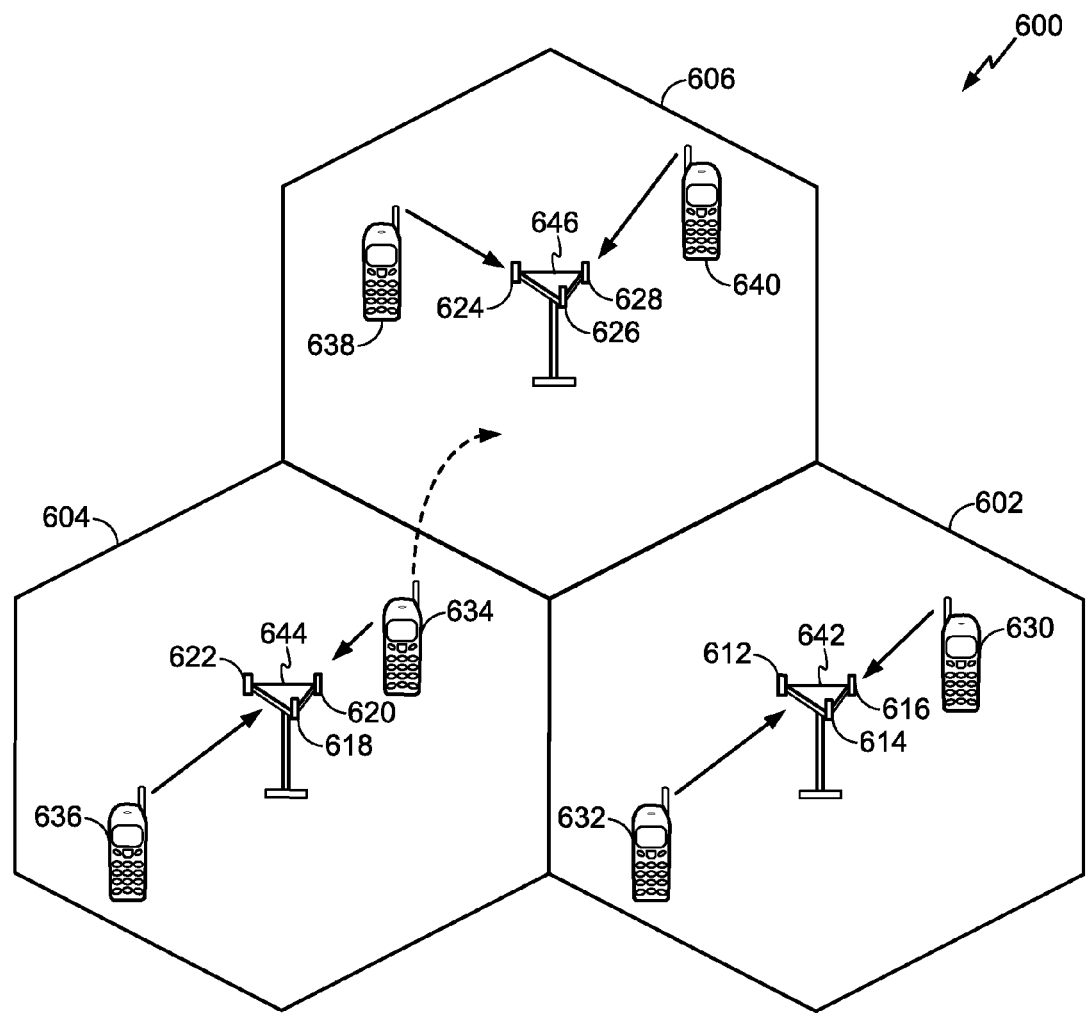
FIG. 8 is a conceptual diagram illustrating an example of an access network.

Referring to FIG. 8, an access network 600 in a UTRAN architecture is illustrated. The multiple access wireless communication system includes multiple cellular regions (cells), including cells 602, 604, and 606, each of which may include one or more sectors. The multiple sectors can be formed by groups of antennas with each antenna responsible for communication with UEs in a portion of the cell. For example, in cell 602, antenna groups 612, 614, and 616 may each correspond to a different sector. In cell 604, antenna groups 618, 620, and 622 each correspond to a different sector. In cell 606, antenna groups 624, 626, and 628 each correspond to a different sector. The cells 602, 604 and 606 may include several wireless communication devices, e.g., User Equipment or UEs, which may be in communication with one or more sectors of each cell 602, 604 or 606. For example, UEs 630 and 632 may be in communication with Node B 642, UEs 634 and 636 may be in communication with Node B 644, and UEs 638 and 640 can be in communication with Node B 646. Here, each Node B 642, 644, 646 is configured to provide an access point to a CN 504 (see FIG. 7) for all the UEs 630, 632, 634, 636, 638, 640 in the respective cells 602, 604, and 606. UEs 630, 632, 634, 636, 638, 640 may correspond to UE 11 (FIG. 1) configured to execute cell selection component 30.

As the UE 634 moves from the illustrated location in cell 604 into cell 606, a serving cell change (SCC) or handover may occur in which communication with the UE 634 transitions from the cell 604, which may be referred to as the source cell, to cell 606, which may be referred to as the target cell. Management of the handover procedure may take place at the UE 634, at the Node Bs corresponding to the respective cells, at a radio network controller 206 (see FIG. 2), or at another suitable node in the wireless network. For example, during a call with the source cell 604, or at any other time, the UE 634 may monitor various parameters of the source cell 604 as well as various parameters of neighboring cells such as cells 606 and 602. Further, depending on the quality of these parameters, the UE 634 may maintain communication with one or more of the neighboring cells. During this time, the UE 634 may maintain an Active Set, that is, a list of cells that the UE 634 is simultaneously connected to (i.e., the UTRA cells that are currently assigning a downlink dedicated physical channel DPCH or fractional downlink dedicated physical channel F-DPCH to the UE 634 may constitute the Active Set).

The modulation and multiple access scheme employed by the access network 600 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 9.

Figure 9:
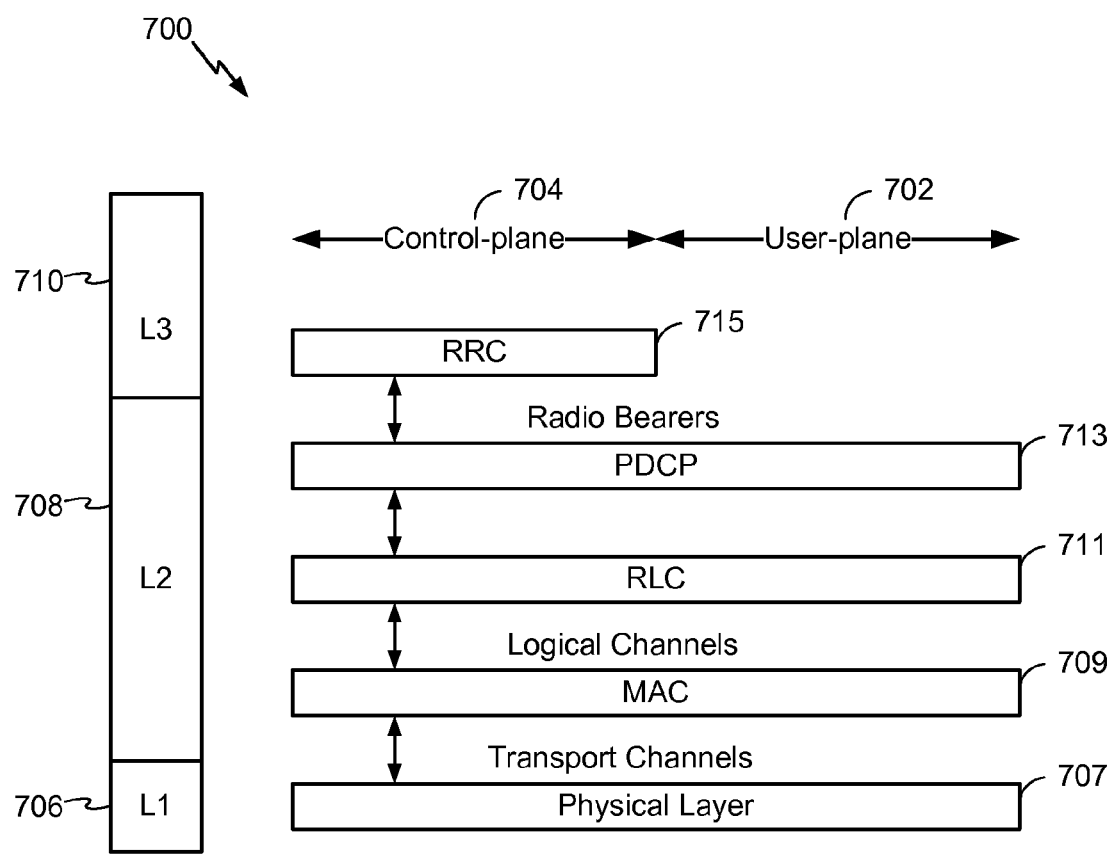
FIG. 9 is a conceptual diagram illustrating an example of a radio protocol architecture for the user and control plane.

Referring to FIG. 9 an example radio protocol architecture 700 relates to the user plane 702 and the control plane 704 of a user equipment (UE) or node B/base station. For example, architecture 700 may be included in a UE such as UE 11 (FIG. 1) configured to execute cell selection component 30. The radio protocol architecture 700 for the UE and node B is shown with three layers: Layer 1 706, Layer 2 708, and Layer 3 710. Layer 1 706 is the lowest lower and implements various physical layer signal processing functions. As such, Layer 1 706 includes the physical layer 707. Layer 2 (L2 layer) 708 is above the physical layer 707 and is responsible for the link between the UE and node B over the physical layer 707. Layer 3 (L3 layer) 710 includes a radio resource control (RRC) sublayer 715. The RRC sublayer 715 handles the control plane signaling of Layer 3 between the UE and the UTRAN.

In the user plane, the L2 layer 708 includes a media access control (MAC) sublayer 709, a radio link control (RLC) sublayer 711, and a packet data convergence protocol (PDCP) 713 sublayer, which are terminated at the node B on the network side. Although not shown, the UE may have several upper layers above the L2 layer 708 including a network layer (e.g., IP layer) that is terminated at a PDN gateway on the network side, and an application layer that is terminated at the other end of the connection (e.g., far end UE, server, etc.).

The PDCP sublayer 713 provides multiplexing between different radio bearers and logical channels. The PDCP sublayer 713 also provides header compression for upper layer data packets to reduce radio transmission overhead, security by ciphering the data packets, and handover support for UEs between node Bs. The RLC sublayer 711 provides segmentation and reassembly of upper layer data packets, retransmission of lost data packets, and reordering of data packets to compensate for out-of-order reception due to hybrid automatic repeat request (HARQ). The MAC sublayer 709 provides multiplexing between logical and transport channels. The MAC sublayer 709 is also responsible for allocating the various radio resources (e.g., resource blocks) in one cell among the UEs. The MAC sublayer 709 is also responsible for HARQ operations.

Figure 10:
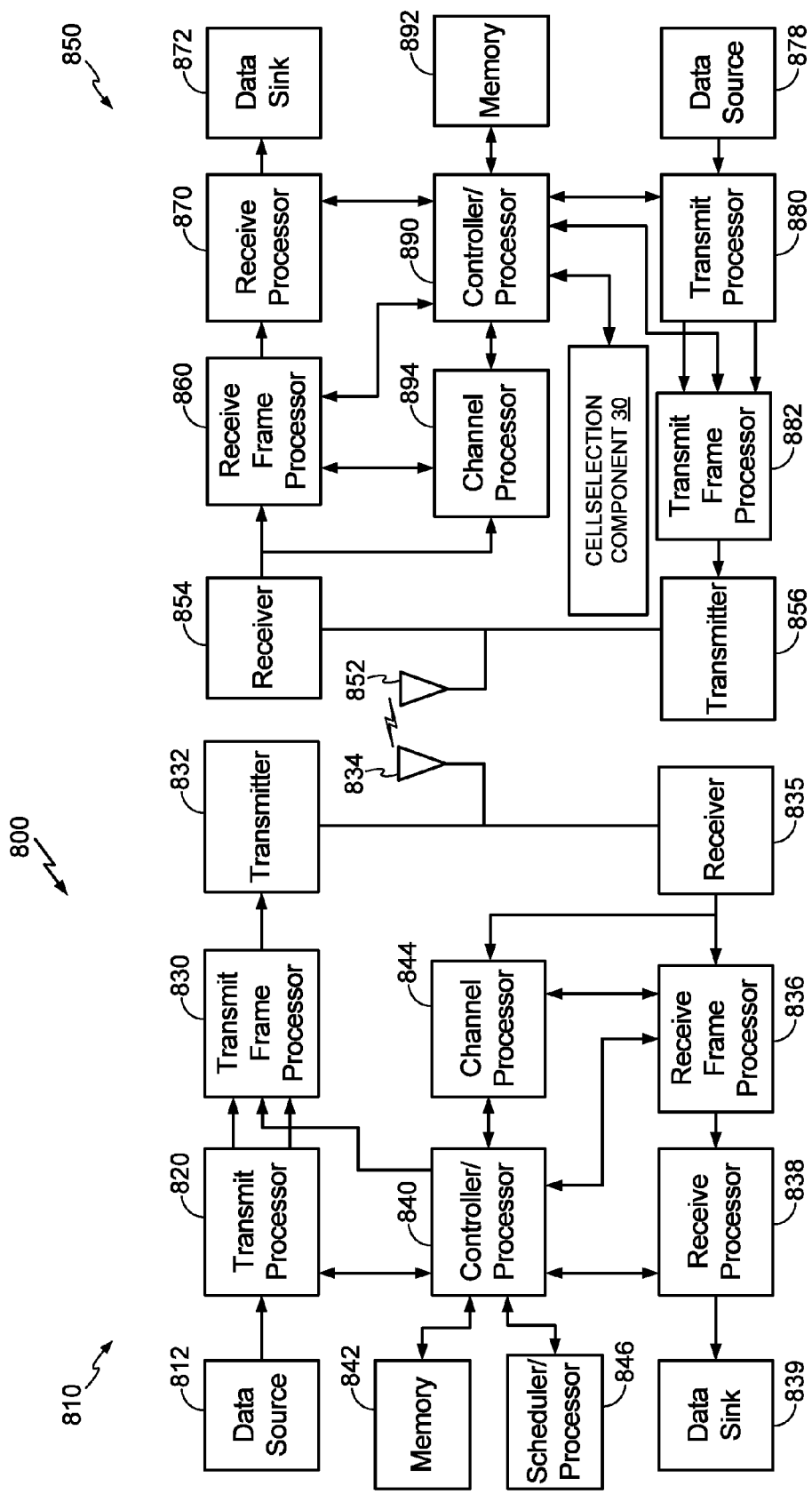
FIG. 10 is a block diagram conceptually illustrating an example of a Node B in communication with a UE in a telecommunications system.

FIG. 10 is a block diagram of a Node B 810 in communication with a UE 850, where the Node B 810 may be the Node B 208 in FIG. 5, and the UE 850 may be the UE 210 in FIG. 5, including the cell selection component 30 for performing the actions described herein. In the downlink communication, a transmit processor 820 may receive data from a data source 812 and control signals from a controller/processor 840. The transmit processor 820 provides various signal processing functions for the data and control signals, as well as reference signals (e.g., pilot signals). For example, the transmit processor 820 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 844 may be used by a controller/processor 840 to determine the coding, modulation, spreading, and/or scrambling schemes for the transmit processor 820. These channel estimates may be derived from a reference signal transmitted by the UE 850 or from feedback from the UE 850. The symbols generated by the transmit processor 820 are provided to a transmit frame processor 830 to create a frame structure. The transmit frame processor 830 creates this frame structure by multiplexing the symbols with information from the controller/processor 840, resulting in a series of frames. The frames are then provided to a transmitter 832, which provides various signal conditioning functions including amplifying, filtering, and modulating the frames onto a carrier for downlink transmission over the wireless medium through antenna 834. The antenna 834 may include one or more antennas, for example, including beam steering bidirectional adaptive antenna arrays or other similar beam technologies.

At the UE 850, a receiver 854 receives the downlink transmission through an antenna 852 and processes the transmission to recover the information modulated onto the carrier. The information recovered by the receiver 854 is provided to a receive frame processor 860, which parses each frame, and provides information from the frames to a channel processor 894 and the data, control, and reference signals to a receive processor 870. The receive processor 870 then performs the inverse of the processing performed by the transmit processor 820 in the Node B 810. More specifically, the receive processor 870 descrambles and despreads the symbols, and then determines the most likely signal constellation points transmitted by the Node B 810 based on the modulation scheme. These soft decisions may be based on channel estimates computed by the channel processor 894. The soft decisions are then decoded and deinterleaved to recover the data, control, and reference signals. The CRC codes are then checked to determine whether the frames were successfully decoded. The data carried by the successfully decoded frames will then be provided to a data sink 872, which represents applications running in the UE 850 and/or various user interfaces (e.g., display). Control signals carried by successfully decoded frames will be provided to a controller/processor 890. When frames are unsuccessfully decoded by the receiver processor 870, the controller/processor 890 may also use an acknowledgement (ACK) and/or negative acknowledgement (NACK) protocol to support retransmission requests for those frames.

In the uplink, data from a data source 878 and control signals from the controller/processor 890 are provided to a transmit processor 880. The data source 878 may represent applications running in the UE 850 and various user interfaces (e.g., keyboard). Similar to the functionality described in connection with the downlink transmission by the Node B 810, the transmit processor 880 provides various signal processing functions including CRC codes, coding and interleaving to facilitate FEC, mapping to signal constellations, spreading with OVSFs, and scrambling to produce a series of symbols. Channel estimates, derived by the channel processor 894 from a reference signal transmitted by the Node B 810 or from feedback contained in the midamble transmitted by the Node B 810, may be used to select the appropriate coding, modulation, spreading, and/or scrambling schemes. The symbols produced by the transmit processor 880 will be provided to a transmit frame processor 882 to create a frame structure. The transmit frame processor 882 creates this frame structure by multiplexing the symbols with information from the controller/processor 890, resulting in a series of frames. The frames are then provided to a transmitter 856, which provides various signal conditioning functions including amplification, filtering, and modulating the frames onto a carrier for uplink transmission over the wireless medium through the antenna 852.

The uplink transmission is processed at the Node B 810 in a manner similar to that described in connection with the receiver function at the UE 850. A receiver 835 receives the uplink transmission through the antenna 834 and processes the transmission to recover the information modulated onto the carrier. The information recovered by the receiver 835 is provided to a receive frame processor 836, which parses each frame, and provides information from the frames to the channel processor 844 and the data, control, and reference signals to a receive processor 838. The receive processor 838 performs the inverse of the processing performed by the transmit processor 880 in the UE 850. The data and control signals carried by the successfully decoded frames may then be provided to a data sink 839 and the controller/processor, respectively. If some of the frames were unsuccessfully decoded by the receive processor, the controller/processor 840 may also use an acknowledgement (ACK) and/or negative acknowledgement (NACK) protocol to support retransmission requests for those frames.

The controller/processors 840 and 890 may be used to direct the operation at the Node B 810 and the UE 850, respectively. For example, the controller/processors 840 and 890 may provide various functions including timing, peripheral interfaces, voltage regulation, power management, and other control functions. The computer readable media of memories 842 and 892 may store data and software for the Node B 810 and the UE 850, respectively. A scheduler/processor 846 at the Node B 810 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:
1. A method of performing cell selection in a wireless communication system for reducing an initial acquisition time between a user equipment (UE) and a network entity, comprising:
   measuring a signal from a cell;
   determining whether one or more measurements of the signal pass or fail a cell selection criteria check that includes a plurality of cell selection threshold values, the plurality of cell selection threshold values being included in at least one successfully decoded system information block (SIB) of the signal;
   determining, in response to the cell selection criteria check failing, whether the plurality of cell selection threshold values are within range of a plurality of corresponding minimum network threshold values, the minimum network threshold values including absolute minimum values for Qqualmin and Qrxlevmin that a network operator or vendor established; and
   performing a cell selection procedure on the cell in response to determining that the plurality of cell selection threshold values are within range of the plurality of corresponding minimum network threshold values.

2. The method of claim 1, wherein determining, in response to the cell selection criteria check failing, whether the plurality of cell selection threshold values are within range of the plurality of corresponding minimum network threshold values includes determining whether a delta value for one of the plurality of cell selection threshold values is configured,
   wherein, when the delta value for the one of the plurality of cell selection threshold values is configured, one of the plurality of corresponding minimum network threshold values includes an absolute minimum network threshold value plus the delta value for the one of the plurality of cell selection threshold values, and
   wherein when the delta value for the one of the plurality of cell selection threshold values is not configured, one of the plurality of corresponding minimum network threshold values includes an absolute minimum network threshold value.

3. The method of claim 2, further comprising:
   determining whether the cell is a frequency-division duplexing (FDD) cell; and
   determining whether an absolute value of each of the plurality of cell selection threshold values plus each of the plurality of corresponding minimum network threshold values are less than or equal to each of a plurality of corresponding range control threshold values, wherein the plurality of corresponding range control threshold values are configured based on at least one of a UE capabilities, network planning, or operator configuration.

4. The method of claim 2, further comprising:
   determining whether the cell is a time-division duplexing (TDD) cell; and
   determining whether an absolute value of the one of the plurality of cell selection threshold values plus the one of the plurality of corresponding minimum network threshold values is less than or equal to a corresponding range control threshold value, wherein the corresponding range control threshold value is configured based on at least one of a UE capabilities, network planning, or operator configuration.

5. The method of claim 1, further comprising attempting to discover a different cell for attempting to perform the cell selection procedure on in response to determining that the plurality of cell selection threshold values are outside the range of the plurality of corresponding minimum network threshold values.

6. The method of claim 1, wherein the plurality of cell selection threshold values include a minimum required quality level in the cell and a minimum required receive level in the cell.

7. The method of claim 1, wherein the one of the plurality of cell selection threshold values includes a minimum required receive level in the cell.

8. The method of claim 1, wherein the at least one successfully decoded SIB corresponds to at least one or both of system information block-3 (SIBS) and system information block-4 (SIB4).

9. The method of claim 1, wherein the at least one successfully decided SIB being successfully decoded on a Primary Common Control Physical Channel (PCCPCH) of the cell.

10. A non-transitory computer-readable medium storing computer executable code for performing cell selection in a wireless communication system for reducing an initial acquisition time between a user equipment (UE) and a network entity, comprising:
   code for measuring a signal from a cell;
   code for determining whether one or more measurements of the signal pass or fail a cell selection criteria check that includes a plurality of cell selection threshold values, the plurality of cell selection threshold values being included in at least one successfully decoded system information block (SIB) of the signal;
   code for determining, in response to the cell selection criteria check failing, whether the plurality of cell selection threshold values are within range of a plurality of corresponding minimum network threshold values, the minimum network threshold values including absolute minimum values for Qqualmin and Qrxlevmin that a network operator or vendor established; and
   code for performing a cell selection procedure on the cell in response to determining that the plurality of cell selection threshold values are within range of the plurality of corresponding minimum network threshold values.

11. The non-transitory computer-readable medium of claim 10, wherein determining, in response to the cell selection criteria check failing, whether the plurality of cell selection threshold values are within range of the plurality of corresponding minimum network threshold values includes determining whether a delta value for one of the plurality of cell selection threshold values is configured,
   wherein, when the delta value for the one of the plurality of cell selection threshold values is configured, one of the plurality of corresponding minimum network threshold values includes an absolute minimum network threshold value plus the delta value for the one of the plurality of cell selection threshold values, and
   wherein when the delta value for the one of the plurality of cell selection threshold values is not configured, one of the plurality of corresponding minimum network threshold values includes an absolute minimum network threshold value.

12. The non-transitory computer-readable medium of claim 11, further comprising:
   code for determining whether the cell is a frequency-division duplexing (FDD) cell; and
   code for determining whether an absolute value of each of the plurality of cell selection threshold values plus each of the plurality of corresponding minimum network threshold values are less than or equal to each of a plurality of corresponding range control threshold values, wherein the plurality of corresponding range control threshold values are configured based on at least one of a UE capabilities, network planning, or operator configuration.

13. The non-transitory computer-readable medium of claim 12, further comprising:
   code for determining whether the cell is a time-division duplexing (TDD) cell; and
   code for determining whether an absolute value of the one of the plurality of cell selection threshold values plus the one of the plurality of corresponding minimum network threshold values is less than or equal to a corresponding range control threshold value, wherein the corresponding range control threshold value is configured based on at least one of a UE capabilities, network planning, or operator configuration.

14. The non-transitory computer-readable medium of claim 10, further comprising code for attempting to discover a different cell for attempting to perform the cell selection procedure on in response to determining that the plurality of cell selection threshold values are outside the range of the plurality of corresponding minimum network threshold values.

15. The non-transitory computer-readable medium of claim 10, wherein the plurality of cell selection threshold values include a minimum required quality level in the cell and a minimum required receive level in the cell; and wherein the one of the plurality of cell selection threshold values includes a minimum required receive level in the cell.

16. An apparatus for performing cell selection in a wireless communication system for reducing an initial acquisition time between a user equipment (UE) and a network entity, comprising:
   means for measuring a signal from a cell;
   means for determining whether one or more measurements of the signal pass or fail a cell selection criteria check that includes a plurality of cell selection threshold values, the plurality of cell selection threshold values being included in at least one successfully decoded system information block (SIB) of the signal;
   means for determining, in response to the cell selection criteria check failing, whether the plurality of cell selection threshold values are within range of a plurality of corresponding minimum network threshold values, the minimum network threshold values including absolute minimum values for Qqualmin and Qrxlevmin that a network operator or vendor established; and
   means for performing a cell selection procedure on the cell in response to determining that the plurality of cell selection threshold values are within range of the plurality of corresponding minimum network threshold values.

17. The apparatus of claim 16, wherein determining, in response to the cell selection criteria check failing, whether the plurality of cell selection threshold values are within range of the plurality of corresponding minimum network threshold values includes determining whether a delta value for one of the plurality of cell selection threshold values is configured,
   wherein, when the delta value for the one of the plurality of cell selection threshold values is configured, one of the plurality of corresponding minimum network threshold values includes an absolute minimum network threshold value plus the delta value for the one of the plurality of cell selection threshold values, and
   wherein when the delta value for the one of the plurality of cell selection threshold values is not configured, one of the plurality of corresponding minimum network threshold values includes an absolute minimum network threshold value.

18. The apparatus of claim 17, further comprising:
   means for determining whether the cell is a frequency-division duplexing (FDD) cell; and
   means for determining whether an absolute value of each of the plurality of cell selection threshold values plus each of the plurality of corresponding minimum network threshold values are less than or equal to each of a plurality of corresponding range control threshold values, wherein the plurality of corresponding range control threshold values are configured based on at least one of a UE capabilities, network planning, or operator configuration.

19. The apparatus of claim 17, further comprising:
means for determining whether the cell is a time-division duplexing (TDD) cell; and
means for determining whether an absolute value of the one of the plurality of cell selection threshold values plus the one of the plurality of corresponding minimum network threshold values is less than or equal to a corresponding range control threshold value, wherein the corresponding range control threshold value is configured based on at least one of a UE capabilities, network planning, or operator configuration.

20. The apparatus of claim 16, further comprising code for attempting to discover a different cell for attempting to perform the cell selection procedure on in response to determining that the plurality of cell selection threshold values are outside the range of the plurality of corresponding minimum network threshold values.

21. The apparatus of claim 16, wherein the plurality of cell selection threshold values include a minimum required quality level in the cell and a minimum required receive level in the cell; and wherein the one of the plurality of cell selection threshold values includes a minimum required receive level in the cell.

22. An apparatus for performing cell selection in a wireless communication system for reducing an initial acquisition time between a user equipment (UE) and a network entity, comprising:
a memory that stores instructions; and
at least one processor coupled with the memory, wherein the at least one processor and the memory are configured to:
measure a signal from a cell;
determine whether one or more measurements of the signal pass or fail a cell selection criteria check that includes a plurality of cell selection threshold values, the plurality of cell selection threshold values being included in at least one successfully decoded system information block (SIB) of the signal;
determine, in response to the cell selection criteria check failing, whether the plurality of cell selection threshold values are within range of a plurality of corresponding minimum network threshold values, the minimum network threshold values including absolute minimum values for Qqualmin and Qrxlevmin that a network operator or vendor established; and
perform a cell selection procedure on the cell in response to determining that the plurality of cell selection threshold values are within range of the plurality of corresponding minimum network threshold values.

23. The apparatus of claim 22, wherein the processor is further configured to whether a delta value for one of the plurality of cell selection threshold values is configured, wherein, when the delta value for the one of the plurality of cell selection threshold values is configured, one of the plurality of corresponding minimum network threshold values includes an absolute minimum network threshold value plus the delta value for the one of the plurality of cell selection threshold values, and
wherein when the delta value for the one of the plurality of cell selection threshold values is not configured, one of the plurality of corresponding minimum network threshold values includes an absolute minimum network threshold value.

24. The apparatus of claim 23, wherein the processor is further configured to:
determine whether the cell is a frequency-division duplexing (FDD) cell; and
determine whether an absolute value of each of the plurality of cell selection threshold values plus each of the plurality of corresponding minimum network threshold values are less than or equal to each of a plurality of corresponding range control threshold values, wherein the plurality of corresponding range control threshold values are configured based on at least one of a UE capabilities, network planning, or operator configuration.

25. The apparatus of claim 23, wherein the processor is further configured to:
determine whether the cell is a time-division duplexing (TDD) cell; and
determine whether an absolute value of the one of the plurality of cell selection threshold values plus the one of the plurality of corresponding minimum network threshold values is less than or equal to a corresponding range control threshold value, wherein the corresponding range control threshold value is configured based on at least one of a UE capabilities, network planning, or operator configuration.

26. The apparatus of claim 22, wherein the processor is further configured to attempt to discover a different cell for attempting to perform the cell selection procedure on in response to determining that the plurality of cell selection threshold values are outside the range of the plurality of corresponding minimum network threshold values.

27. The apparatus of claim 22, wherein the plurality of cell selection threshold values include a minimum required quality level in the cell and a minimum required receive level in the cell.

28. The apparatus of claim 22, wherein the one of the plurality of cell selection threshold values includes a minimum required receive level in the cell.

29. The apparatus of claim 22, wherein the at least one successfully decoded SIB corresponds to at least one or both of system information block-3 (SIB3) and system information block-4 (SIB4).

30. The apparatus of claim 22, wherein the at least one successfully decided SIB being successfully decoded on a Primary Common Control Physical Channel (PCCPCH) of the cell.

* * * * *